(12) United States Patent
Olafsson

(10) Patent No.: US 6,730,370 B1
(45) Date of Patent: May 4, 2004

(54) METHOD AND APPARATUS FOR PROCESSING MATERIALS BY APPLYING A CONTROLLED SUCCESSION OF THERMAL SPIKES OR SHOCKWAVES THROUGH A GROWTH MEDIUM

(76) Inventor: Sveinn Olafsson, 200 Kopavogur Iceland, Kopavogur (IS)

(*) Notice: Subject to any disclaimer, the term of this patent is extended or adjusted under 35 U.S.C. 154(b) by 0 days.

(21) Appl. No.: 09/670,028

(22) Filed: Sep. 26, 2000

(51) Int. Cl.[7] ............ H01J 37/30; B05D 3/06; B05D 3/00; H05H 1/48
(52) U.S. Cl. ............ 427/596; 427/552; 427/540; 427/581; 427/580; 216/94; 216/63; 204/164; 219/121.12; 219/121.24
(58) Field of Search ............... 427/552, 596, 427/597, 581, 583, 582, 584, 553, 540, 555, 580; 216/94, 63, 65, 66; 204/192.38, 164, 298.4, 298.36; 219/121.15, 121.19, 121.2, 121.12, 121.24; 118/723 R; 428/195, 209, 220, 688, 689, 704

(56) References Cited

U.S. PATENT DOCUMENTS

| | | |
|---|---|---|
| 3,663,788 A | 5/1972 | Inoue |
| 3,713,213 A | 1/1973 | Cranston |
| 3,720,598 A | 3/1973 | Thompson |
| 3,778,893 A | 12/1973 | Thompson |
| 3,805,120 A | 4/1974 | Cranston |
| 4,131,524 A | 12/1978 | Gieles |
| 4,343,993 A | 8/1982 | Binnig et al. |
| 4,520,252 A | 5/1985 | Inoue |
| 4,566,937 A | 1/1986 | Pitts |
| 4,731,515 A | 3/1988 | Savage et al. |
| 4,896,044 A | 1/1990 | Li et al. |
| 5,015,323 A | 5/1991 | Gallagher |
| 5,038,322 A | 8/1991 | Van Loenen |
| 5,043,578 A | 8/1991 | Guethner et al. |
| 5,047,649 A | 9/1991 | Hodgson et al. |
| 5,352,330 A | 10/1994 | Wallace |
| 5,509,843 A | 4/1996 | Akama |
| 5,534,311 A | 7/1996 | Shaw et al. |
| 5,648,128 A | 7/1997 | Yeh et al. |
| 5,728,261 A | 3/1998 | Wolfe et al. |
| 5,753,088 A * | 5/1998 | Olk .................... 204/173 |
| 5,837,332 A | 11/1998 | Takahashi et al. |
| 6,001,426 A | 12/1999 | Witherspoon et al. |
| 6,063,243 A * | 5/2000 | Zettl et al. ............ 204/164 |
| 6,261,421 B1 | 7/2001 | Meunier et al. |

OTHER PUBLICATIONS

Hackh's Chemical Dictionary, 3rd ed., J Grant, ed., McGraw–Hill Book Comp., Inc., N.Y. except–p. 234, 1944 no month.*

(List continued on next page.)

Primary Examiner—Marianne Padgett
(74) Attorney, Agent, or Firm—Bacon & Thomas, PLLC

(57) ABSTRACT

A method and apparatus for locally raising the temperature of a material in order to facilitate chemical reactions or processes related to growth or removal of the material utilizes an electrode to apply, in the presence of a growth or removal medium, a controlled succession of thermal spikes or shockwaves of varying energy. The scale of the thermal spikes or shockwaves, and the area of the material affected by the resulting energy transfer, is on the order of a few nanometers to several hundred micrometers, and the duration of the thermal spikes or shockwaves ranges from a few picoseconds to several hundred nanoseconds. The growth or removal medium may be a cryogenic liquid, although other growth media, including liquids, solids, gases in critical or non-critical state, and mixtures of liquids and solids, solids and gases, and liquids and gases, may also be employed. The electrode may be an electrode emitter tip or, in some cases, may serve as an anode for electrodes drawn from the workpiece or growth or removal medium.

16 Claims, 6 Drawing Sheets

OTHER PUBLICATIONS

*Hawley's Condensed Chemical Dictionary*, 12$^{th}$ ed, R.J. Lewis, Sr, ed., Van Nostrand Reinhold Comp., N.Y., except p. 326, 1993 no month.*

*Encyclopedia of Physico*, 2$^{nd}$ ed, R. Lerner et al, eds., VCH Publishers, Inc, N.Y., except, p. 214–215, 1991 no month.*

Abstract of WO 02/26400 (PCT/US01/27729) to S. Olafsson, Apr. 4, 2002.*

Marchand, H., et al., *Structural and optical properties of GaN laterally overgrown on Si(111) by metalorganic chemical vapor deposition using an A1N buffer layer*, pp. 1–10, MRS Internet J. Nitride Semicond. Res. 4, 2 (1999). (no month given, but after Mar. 10$^{th}$).

Van der Stricht, W., et al., *Study of GaN films grown by metalorganic chemical vapour deposition*, pp. 1–6, MRS Internet J. Nitride Semicond. Res. vol. 1, Art. 3 (1996). (month not given, but after Aug. 5$^{th}$).

Marchand, H., et al., *Fast Lateral Epitaxial Overgrowth of Gallium Nitride by Metalorganic Chemical Vapor Deposition Using a Two–Step Process*, pp. 1–6, MRS Internet J. Nitride Semicond. Res. 4S1, G4.5 (1999). no month.

Runge, Keith, et al., *Shock and Pressure Wave Propagation in Nano–fluidic Systems*, Abstract, Sixth Foresight Conference on Molecular Nanotechnology (1998). no month.

* cited by examiner

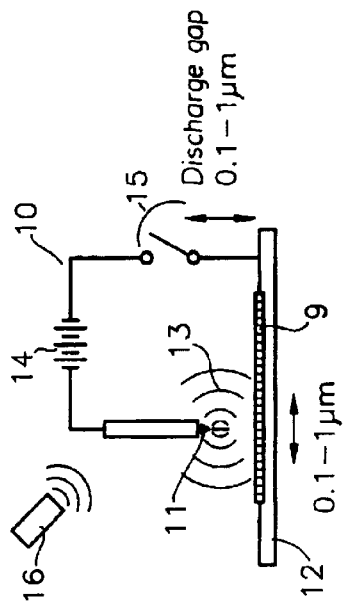
FIG. 1
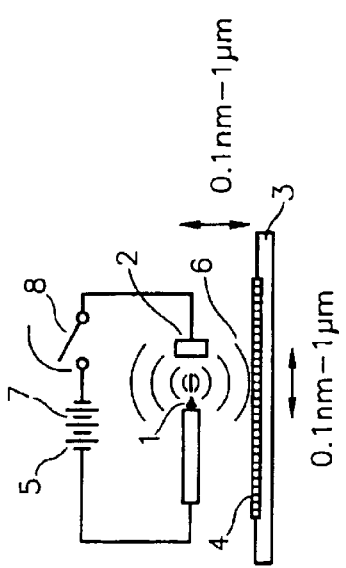
FIG. 2
FIG. 6
| Liquid | Atomic Number | Melt. point [°K] | Boiling point [°K] | Critical Temp. [°K] | Critical Pressure [Bar] | Heat of Vaporisat. [$10^3$ JK$^{-1}$ kg$^{-1}$] | Heat Capacity [JK$^{-1}$ kg$^{-1}$] |
|---|---|---|---|---|---|---|---|
| H$_2$ | 1 | 13.8 | 20.3 | 33.3 | 17 | 310 | 14200 |
| N$_2$ | 7 | 63.0 | 77.4 | 126.2 | 34 | 200 | 1040 |
| O$_2$ | 8 | 54.8 | 90.2 | 154.6 | 51 | 213 | 920 |
| F$_2$ | 9 | 55.5 | 85.4 | 144.0 | 57 | 316 | 750 |
| Ne | 10 | 24.5 | 27.0 | 54.0 | 27 | 86 | 1030 |
| Ar | 18 | 83.8 | 87.3 | 150.8 | 48 | 158 | 520 |
| Cl$_2$ | 17 | 171.6 | 239.1 | 417.0 | 77 | 282 | 500 |
| Kr | 36 | 116.6 | 120 | 209.4 | 55 | 108 | – |
| Xe | 54 | 161.3 | 165.1 | 289.7 | 59 | 102 | – |

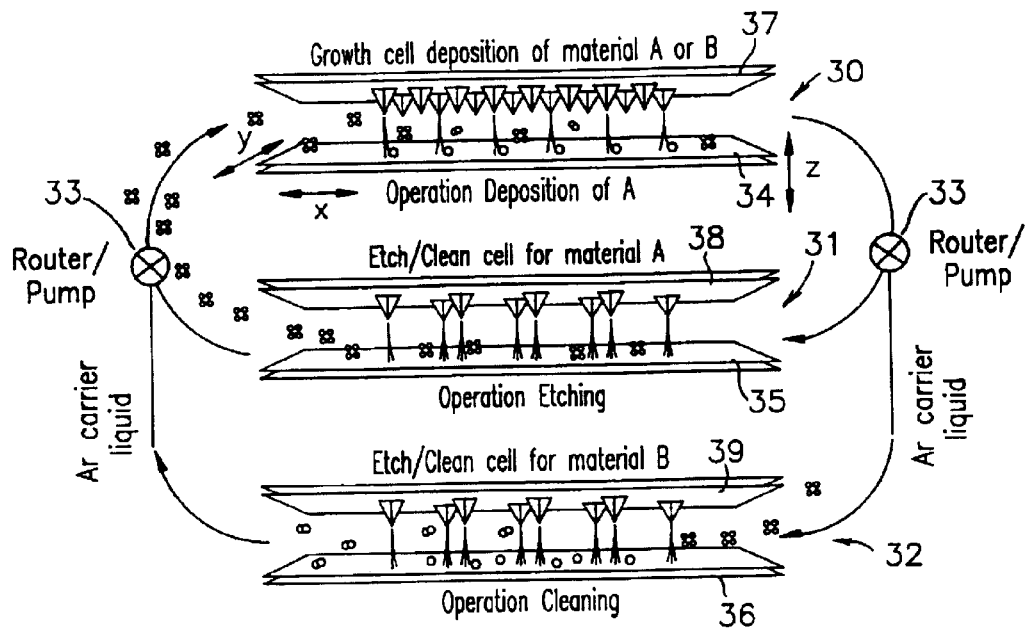
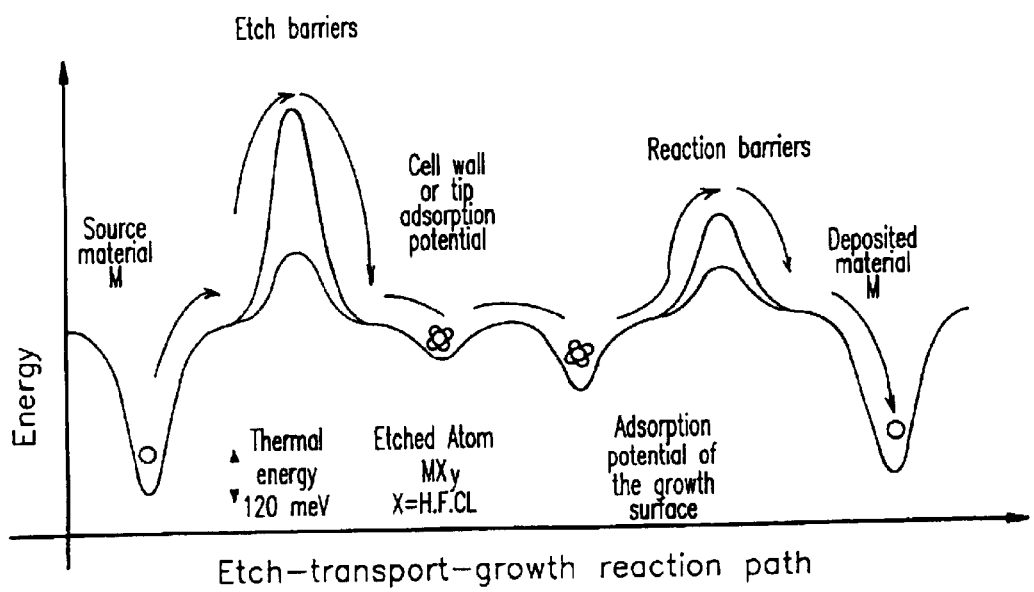

FIG. 8(a)

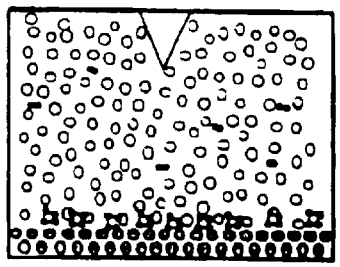

Before nanodischarge
Physisorption of etched resource atom

FIG. 8(b)

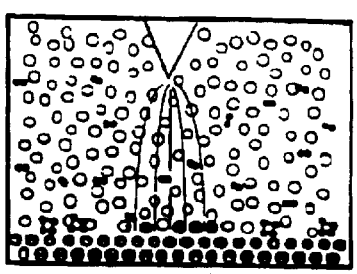

Weak nanodischarge for
electron induced dissociative chemisorption
of etched resource atom or deposition

FIG. 9(a)

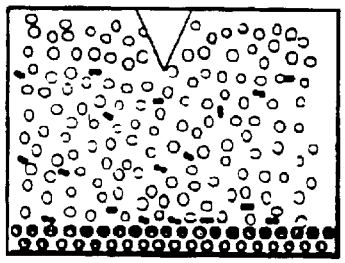

Before nanodischarge
Physisorption of etchant molecules

FIG. 9(b)

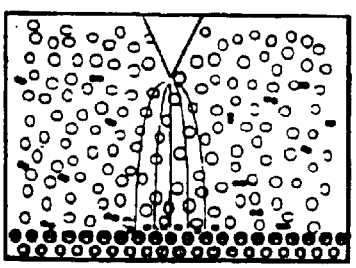

Weak nanodischarge for
electron induced dissociative chemisorption

FIG. 9(c)

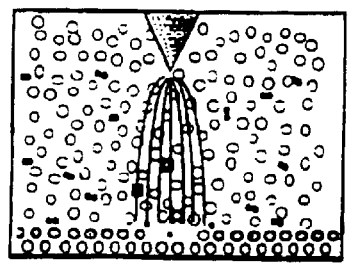

Strong nanodischarge
Electron induced chemical etching

FIG. 9(d)

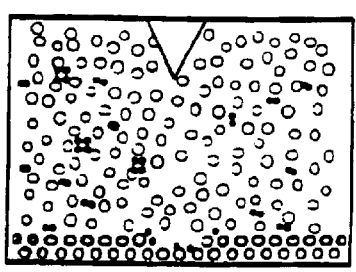

After nanodischarge
re-physisorption of etchant molecules

T = 80–150° K    Pressure = 1.0–50 Bar

○ Argon    ○ Resource atom    ✖ Etched resource atom
● Etchant molecule

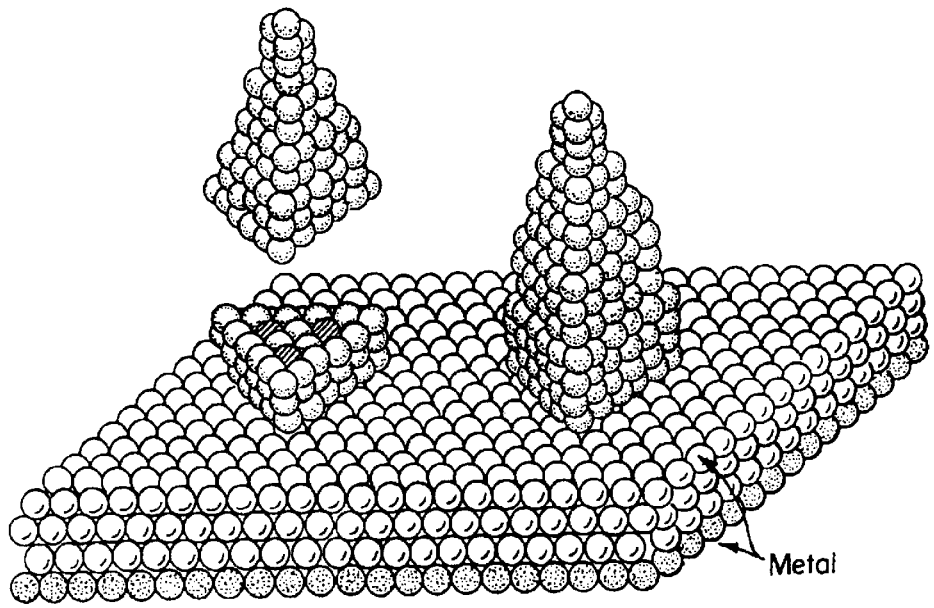
FIG. 13
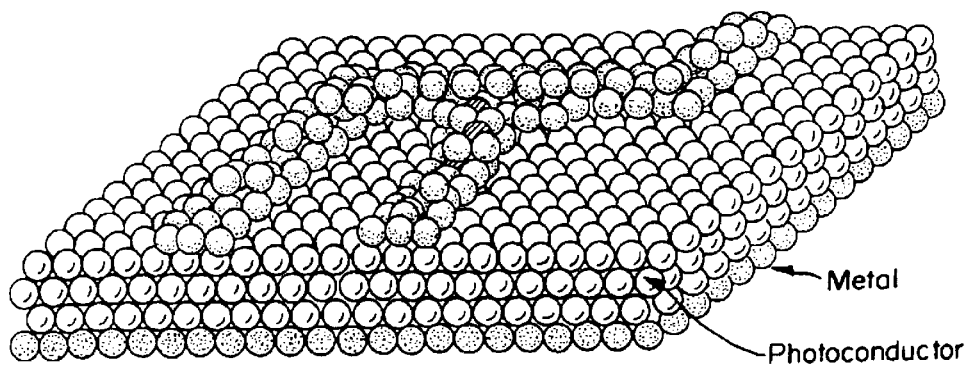
FIG. 14

METHOD AND APPARATUS FOR PROCESSING MATERIALS BY APPLYING A CONTROLLED SUCCESSION OF THERMAL SPIKES OR SHOCKWAVES THROUGH A GROWTH MEDIUM

BACKGROUND OF THE INVENTION

1. Field of the Invention

This invention generally relates to processing of materials, including growth or deposition of the materials, and also to removal of materials. More specifically, the invention relates to a method and apparatus for locally raising the temperature of a material in order to facilitate chemical reactions or changes in physical state related to processing of the material by using an electrode tip, such as an electron emitter tip, to apply a controlled succession of thermal annealing spikes (hereinafter referred to as thermal spikes) or shockwaves of varying energy through a growth or removal medium (hereinafter referred to as a growth medium, even though the medium could also be used in processes involving etching or cleaning and no "growth"). The scale of the thermal spikes or shockwaves, and the area of the material affected by the resulting energy transfer, is on the order of a few nanometers to several hundred micrometers, and the duration of the thermal spikes or shockwaves ranges from a few picoseconds to several hundred nanoseconds. The growth medium may be a cryogenic liquid, although it is within the scope of the invention to use other growth media, including liquids, solids, gases in critical or non-critical state, and mixtures of liquids and solids, solids and gases, and liquids and gases.

The method and apparatus of the invention may be used for a variety of industrial applications and manufacturing processes, including deposition and/or growth of thick or thin film crystalline or non-crystalline materials, etching or cleaning of materials, and formation of nanostructures.

2. Description of Related Art

A. Introduction

The problem addressed by the present invention is the problem, common in the field of materials processing, of how to add energy during processing of a material in order to speed-up chemical reactions or processes, overcome energy barriers, or otherwise improve processing efficiency or product quality, without generating defects or damaging in the material, and/or without interfering with other reactions or processes necessary to provide an acceptable end product.

The oldest and simplest way to apply energy to a material during processing is simply to process the material in a high temperature environment as in, by way of example, physical vapor deposition (PVD), chemical vapor deposition (CVD), or metalorganic chemical vapor deposition (MOCVD). Alternatively, energy may be applied directly to a material being deposited or transferred, as in sputter deposition and various etching methods, by using shockwaves as in explosive bonding methods, or by direct application of energy using lasers or radiation. In all such materials processing methods, the objective has always been to transfer the necessary energy in the most efficient manner while minimizing any damage that might occur as a result of the energy transfer.

The present invention also addresses the problem of energy transfer efficiency and damage mitigation, but utilizes a mechanism different from all other known materials processing methods and apparatus, namely the application, in the presence of a growth medium, of a controlled succession of thermal spikes or shockwaves of varying energy to a nanoscale area of the material.

The term "nanoscale" as used herein refers to dimensions on the order of less than one nanometer (including atomic dimensions of approximately 0.1 to 0.15 nm) to several tens of micrometers, as opposed to the dimensions of the non-localized high energy shockwaves produced by spark discharges for the purpose of vaporizing materials in order to facilitate binding of coatings to a surface, as described for example in U.S. Pat. No. 3,663,788. The use of shock waves on a macroscopic scale is a variation of the explosive bonding technique used to join otherwise incompatible metals, which is fundamentally different than the much more controlled application of energy provided by the present invention.

The most relevant prior art known to the inventor, which shares with the present invention localization of the energy transfer, and the use of a cryogenic growth medium (optional in the present invention), is the "cryogenic furnace" technique disclosed in U.S. Pat. No. 3,720,598. According to this technique, an oscillating Josephson junction having "extremely small dimensions" is formed by spark erosion between capacitor electrodes made up of the materials to be vaporized, thereby concentrating as much energy as possible on a small area.

The present invention shares with the cryogenic furnace concept the temporal and spatial localization of energy applied to a material for the purpose of "establishing chemical and physical state in materials" (col. 1, lines 14–27 of U.S. Pat. No. 3,720,598), and in particular to facilitate growth or removal of materials, as well as the use (in a preferred embodiment of the present invention) of a cryogenic medium through which the energy is applied, but is distinguishable in a number of ways:

- instead of using a plasma arc discharge to temporarily vaporize the medium and material being processed, the present invention uses electron emission (either from an electron emitter tip, or from the workpiece or growth medium in case the polarity of the emitter tip is reversed) to generate thermal spikes or shockwaves that propagate in the medium in order to enable a more controllable energy transfer, eliminating the high energy plasma ions inherent in plasma discharge arrangements;
- The impulses are controlled to provide a succession of spikes of varying energy rather than a steady state or oscillating field;
- The size of the area affected by the discharge is reduced even further than in the cryogenic furnace technique to nanometer or atomic scale, thereby reducing the overall amount of energy that needs to be supplied to achieve a desired local temperature; and
- The apparatus in which the growth or removal of materials takes place is adapted to facilitate insertion and removal of materials from the growth medium, cleaning of the growth medium, as well as insertion and removal of the substrate on which growth occurs or from which material is to be removed, so as to enable use of the system in industrial manufacturing processes.

These differences are critical to the practicality of the present invention relative to the technique disclosed in U.S. Pat. No. 3,720,598. While capable of delivering high energy levels to a small area, the cryogenic furnace technique described in U.S. Pat. No. 3,720,598 ultimately proved impractical for manufacturing purposes because of the inability to prevent destruction of an unacceptably high percentage of the grown material by the high energy tail in the distribution of ions created by the plasma arc. Furthermore, alternative techniques that were eventually implemented in the years following the originally cryogenic furnace proposal, such as electron synchrotron radiation, laser heating, and rapid thermal annealing, while more controllable and less destructive, are capable of delivering only a relatively small amount of energy over a relatively large area, barely sufficient to break chemical bonds and improve mobility on growing surfaces. To date, the most promising of these methods is electron synchrotron radiation, but this method requires equipment costing a minimum of $100 Million, and is not readily available or adaptable to ordinary manufacturing.

While the present invention shares with several of the above-mentioned prior arrangements the concept of applying spatially and temporally localized bursts of energy to a material in order to change its physical or chemical state and facilitate material growth, the manner of energy delivery is fundamentally different, involving the propagation in the growth medium, and in particular a cryogenic growth medium, of nanoscale bursts of energy in an arrangement adapted for mass processing of the materials to be grown or otherwise altered or formed.

The method and apparatus of the invention may be used as a replacement for a variety of conventional systems, including CVD and MOCVD, as well as sputter deposition, molecular beam epitaxy (MBE), electrical plating in electrochemical solution, and other methods too numerous to list. Although specific examples of materials are set forth below, the invention is not intended to be limited to specific materials or groups of materials, but rather is intended to apply to any materials capable of being grown in bulk form or on a substrate, or of being removed from a substrate, in an appropriate growth medium, using shock or heat impulses that propagate through the cryogenic medium in order to apply energy or heat to the medium on a nanometer scale.

SUMMARY OF THE INVENTION

It is accordingly a first objective of the invention to provide a method of applying energy to a material for the purpose of facilitating chemical reactions or processes related to growth or removal of an area of material, without damaging the material due to the high temperatures normally required to facilitate such chemical reactions or processes.

It is a second objective of the invention to provide a method of facilitating chemical reactions or processes related to growth or removal of an area of material by temporally and spatially localized application of energy, without the problems of high energy tails inherent in plasma arc discharge methods.

It is a third objective of the invention to provide a method of energy enhanced material growth or removal which utilizes readily available equipment suitable for use in large-scale commercial manufacturing.

It is a fourth objective of the invention to provide a method of more efficiently growing nanostructures of various shapes and for a variety of purposes.

It is a fifth objective of the invention to provide apparatus for applying energy to a material for the purpose of facilitating chemical reactions or processes related to growth or removal of an area of material, without damaging the material due to the high temperatures normally required to facilitate such chemical reactions or processes, and without the problems of high energy tails inherent in plasma arc discharge methods.

It is a sixth objective of the invention to provide apparatus adapted to facilitate insertion and removal of materials from a medium in which growth and/or a material removal process such as etching is to occur, cleaning of the cryogenic growth medium, as well as insertion and removal of the substrate on which growth occurs or from which material is to be removed, so as to enable use of the apparatus in industrial manufacturing processes.

It is a seventh objective of the invention to provide apparatus capable of performing multiple processing steps, including growth of materials on a workpiece followed by cleaning and/or etching of one or more materials, utilizing a single cell divided into multiple subcells or sub-areas, and a single controller, without requiring removal and transport of the workpiece from the apparatus between processing steps.

It is an eighth objective of the invention to provide an etch-transport-growth reaction path that enables recycling of etched materials back into the growth cell.

These objectives are achieved, in accordance with the principles of a preferred embodiment of the invention, by providing a method of applying energy to a substrate or material on which additional material is to be grown, or from which material is to be removed, by transmitting heat or shock impulses to the substrate or material through a cryogenic medium. The heat or shock impulses are applied by a nanometer scale electrode tip immersed in the growth medium, which in the illustrated examples is a cryogenic liquid, to which is applied fast, variable, voltage pulses of on the order of picoseconds to hundreds of nanoseconds. The anode to which electrons are transmitted may either be a discrete element or a portion of the workpiece, and may consist of an individual scannable electrode tip or an array of electrode tips. In the latter case, the electrons are drawn from the electrode tip into the liquid and accelerated until they hit a specific target area of the workpiece or substrate being processed, while an individual electrode tip can be used to transmit shockwaves parallel to the workpiece and thereby indirectly transmit energy to a larger area of the workpiece.

In the case of a material growth apparatus suitable for use in industrial processes, such as manufacture of thin film or semiconductor devices, the apparatus of the invention may, according to a preferred embodiment of the invention, include any or all of the following features:

- a growth chamber;
- a mechanism for introducing growth material into the growth chamber;
- a mechanism for cleaning the growth medium to remove growth material and contaminants from the growth chamber;
- a single electrode tip or array of tips arranged to operate on a nanoscale;
- a controller for controlling a discharge from the single tip or array of tips;
- a regulator for controlling temperature and pressure of cryogenic liquid in the chamber;
- a mechanism for circulating the growth medium through the growth chamber; and
- provision of at least one chemically inert working cell surface with very low physisorbtion energies.

Since the same basic structure may be used for both growth and removal of a material or materials from the substrate or workpiece, the growth chamber of an especially preferred embodiment of the invention may utilize a single cell divided into multiple subcells or sub-areas for sequentially processing the substrate or workpiece by deposition of materials, followed by etching or cleaning of the resulting product. In a particularly advantageous implementation of the preferred embodiments of the invention, growth, etching, and cleaning all occur in a single growth chamber divided into multiple cells, permitting recycling of etched materials.

In the illustrated examples, the growth medium in which growth or removal of materials occurs is a cryogenic liquid which is preferably chemically inert. Examples include Argon and related noble elements, with the liquid serving to (i) act as a local heating medium on a scale of a few nanometers to several hundred micrometers, (ii) lower the growth temperature and slow down chemical reactions or kinetics, and (iii) act as a carrier for growth or removed materials to and/or from the growth zone.

Alternatively, depending on the density and/or pressure of the growth medium and on the tip distance, the growth medium may serve primarily as a carrier for growth or removed materials and/or to keep a growth species in place following transfer of energy to the workpiece.

Examples of materials to which the present invention can be applied are, GaN, which is used to form blue lasers, conventionally grown at T=600–800° C. using the metalorganic chemical vapor deposition (MOCVD) method, and $Al_2O_3$ hard coating films conventionally grown by CVD at temperatures of 1000–1100° C. in order to obtain the hard crystalline α and β phases of $Al_2O_3$, although the invention is not to be limited to any specific materials or group of materials.

In addition to the above-described processing of materials by growth, etching, cleaning, and/or other processing steps, the method and apparatus of the invention may be used in conjunction with auxiliary processing methods and apparatus for facilitating the processing. By way of example but not limitation, processing of a material using the method and apparatus of the invention may be assisted by an optional photon source of sufficient energy to lower reaction barriers or and/or to break or weaken chemical bonds in order to further facilitate the growth, etching, cleaning, and or other processing of the material.

BRIEF DESCRIPTION OF THE DRAWINGS

FIG. 1 is a schematic view of an apparatus for applying energy to a local, nanoscale, area of material in order to facilitate chemical reactions or processes related to growth or removal of materials relative to or from a workpiece in accordance with the principles of a first preferred embodiment of the invention.

FIG. 2 is a schematic view of an apparatus for applying energy to a nanoscale area of material in accordance with the principles of a second preferred embodiment of the invention.

FIG. 6 is a table illustrating properties of various cryogenic liquids which may be used in connection with the preferred embodiments of the invention.

FIG. 7 is a schematic view of a variation of the apparatus illustrated in FIG. 2, arranged to included multiple cells for facilitating sequential growth and etching of a workpiece.

FIGS. 8A and 8B are schematic views illustrating the two stages occurring in a growth/cleaning process according to the principles of the invention.

FIGS. 9A–9C are schematic views illustrating the four stages of an etching process according to the principles of the invention.

FIG. 10 is a graph illustrating the manner in which energy is applied during sequential growth and etching using the apparatus of FIG. 7.

FIGS. 12–14 are schematic views illustrating examples of nanodevices constructed in accordance with the principles of the third preferred embodiment of the invention.

DETAILED DESCRIPTION OF THE PREFERRED EMBODIMENTS

Figure 3:
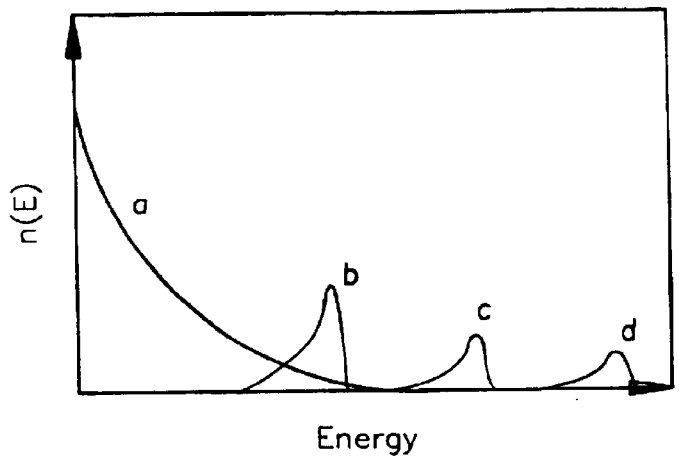
FIG. 3 is a graph of energy distribution functions showing thermal spikes of varying energy as used by the preferred embodiment of the present invention as compared with the high energy tail of a conventional high temperature growth apparatus.

The invention is a method and apparatus for applying energy to nanoscale area of a workpiece, for the purpose of adding or removing materials from the workpiece. In particular, the invention applies the energy by transmitting heat or shockwave impulses through a medium, referred to herein as a growth medium even though the medium may also be used to facilitate material removal. The heat or shockwave impulses heat the medium adjacent the workpiece, thereby facilitating chemical reactions or processes, such as the breaking of chemical bonds, associated with the growth or removal of materials from the workpiece. Although not limited to a cryogenic medium, the invention is especially suited for use in systems employing a cryogenic medium, which not only transfers heat to the workpiece or materials adjacent the workpiece, but also serves to mediate heating and to transport material to and from the workpiece. By operating on a nanoscale level, i.e., an area of less than one nanometer to several hundred micrometers, which is essentially the range of resolution of a scanning electron microscope, and in particular by using a cryogenic medium as the growth medium, heating of the workpiece can be minimized while enabling extremely fine control of the growth or removal process, including formation of nanostructures.

An apparatus for transmitting energy to the workpiece is illustrated in FIG. 1. In this apparatus, an electrode tip 1 and a discrete anode 2 are immersed in a growth medium (not shown in FIG. 1) and positioned above a platform 3 on which is present a workpiece 4 on which material is being grown or removed. When a fast voltage pulse on the order of a few picoseconds to hundreds of nanoseconds is applied by a circuit 5 across the electrode tip 1 and the anode 2, electrons are drawn from the tip 1 into the growth medium and are accelerated until they hit the anode, generating a shock wave 6 that transfers energy to the workpiece.

The circuit 5 is schematically illustrated as including a power source 7 and switch 8 for controlling the duration of the pulses. It will of course be appreciated, however, that in practice the circuit can take a wide variety of forms, including microprocessor circuits and/or discrete components arranged to generate voltage pulses of a desired shape and duration, depending on the requirements of the specific materials growth or removal process to which the apparatus of the preferred embodiment is applied. Pulse generating circuits of all types are well-known to those skilled in the electrical arts and form no part of the present invention, which relates to applications of the circuit rather than to the circuit itself. In addition, those skilled in the art will appreciate that the form of the shock/heat waves may also be varied by varying the shape of the tips or arrays of tips, and that focusing or guiding elements such as appropriately positioned reflectors may also be included without departing from the scope of the invention.

As indicated by the horizontal and vertical arrows in FIG. 1, the platform 3 is arranged to be moved horizontally and vertically in order to move different areas of the workpiece under the shockwave and to vary the distance travelled by the shockwave or, equivalently. The range of horizontal movement should of course be sufficient to enable scanning of the entire workpiece while the range of vertical movement may, by way of example, be within the range of from 0.1 nm to 1 µm, with provision for controlling the discharge gap or distance in order to either vary the gap or to control the gap if a constant discharge gap is required. The discharge gap or distance between the electrode tip and anode may also be varied, by way of example, within a range of 0.1 nm to 1 µm. Although a single scanning electrode tip may be used, in the illustrated embodiment, the number of individually controllable tips in an array may be as many as $10^5$ to $10^6$ tips/cm² of sample area, and the tip array should be movable as a unit with a precision of at least 1 nm over a distance of 10 µm in both the x and y directions.

In contrast to the embodiment illustrated in FIG. 1, the preferred embodiment illustrated in FIG. 2 transmits energy directly towards the workpiece 9 by connecting the voltage supplied by circuit 10 between an electrode tip 11 and the platform 12, or between the electrode tip and the workpiece itself, with heating of the medium being accomplished either directly by the energy of the electrons and/or through a shock wave 13 in a manner similar to that illustrated in FIG. 1. The platform 12 may again be horizontally and vertically movable, including provision as necessary for controlling the discharge gap or distance to vary the gap or distance, or to maintain a constant gap as necessary, while circuit 10 may be similar to circuit 5 shown in FIG. 1, including schematically illustrated power source 14, pulse defining switch or switching elements 15 implemented in practice in the form of discrete components and/or microprocessor based circuitry.

In addition to the basic processing apparatus, FIG. 2 illustrates an optional photon source 16 for directing photons at the workpiece during processing, the photons having sufficient energy to lower reaction barriers or to break or weaken chemical bonds in order to further facilitate processing. It will be appreciated by those skilled in the art that the photon source may be a laser, x-ray source, or any other photon source, and that the photon source may be omitted, used in the embodiment of FIG. 1, or replaced by any other energy source depending on the type of processing being performed.

FIG. 3 illustrates an important principle of the present invention, namely the transmission of energy in the form of pulse having relatively narrow spectra, indicated by the letters "b," "c," and "d." It can be seen from FIG. 3 the total energy of each pulse is less than the total energy of a prior art plasma arc discharge "a" used for the same purpose, as described for example in U.S. Pat. No. 3,720,598, even though the pulses are each at a higher energy. This has at least two advantages. First, the higher energies are provided by an electron stream mediated by the growth medium rather than high energy ions limits damage due to collisions between the high energy ions and the workpiece. In addition, the narrow spectra of the pulses, together with their limited temporal and spatial extent (which is not illustrated in FIG. 3), maximizes the transfer of energy for a specific purpose while limiting damage to the workpiece. Of course, the energies supplied by the method and apparatus of the invention are not limited to those supplied by plasma arc discharge, but will depend solely on the specific growth or removal process to which the method and apparatus of the invention are applied.

Figure 4:
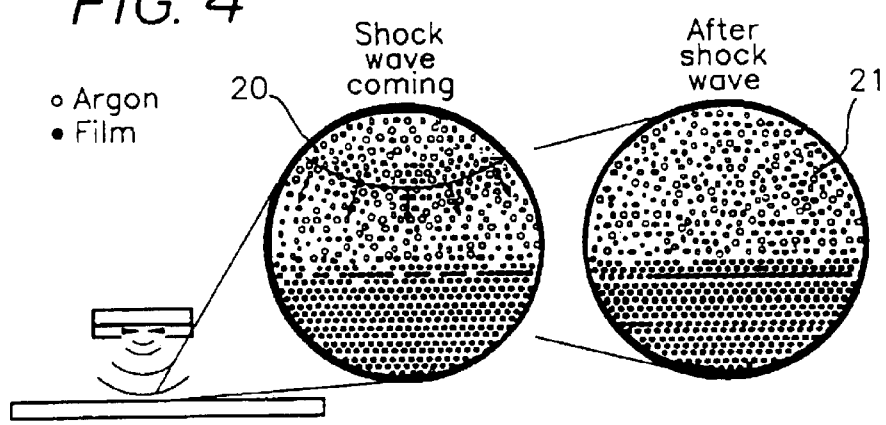
FIG. 4 is a schematic view illustrating deliver of a shock wave pulse to a thin film in a cryogenic liquid using the apparatus of FIG. 1.

The effect of the energy transfer provided by the transverse discharge apparatus of FIG. 1 is illustrated in FIG. 4. In the example shown in FIG. 4, the growth medium is Argon and the workpiece is a thin film to which particles of thin film material have been transported. In step 20, prior to arrival of an energy pulse in the form of a shock wave, the thin material has settled non-uniformly over the surface of previously deposited layers of thin film material. In step 20, the shock wave has heated the medium and caused thermal motion of the particles of thin film material, which in turn has caused redistribution of the particles in a more uniform fashion over the surface of the thin film.

Figure 5:
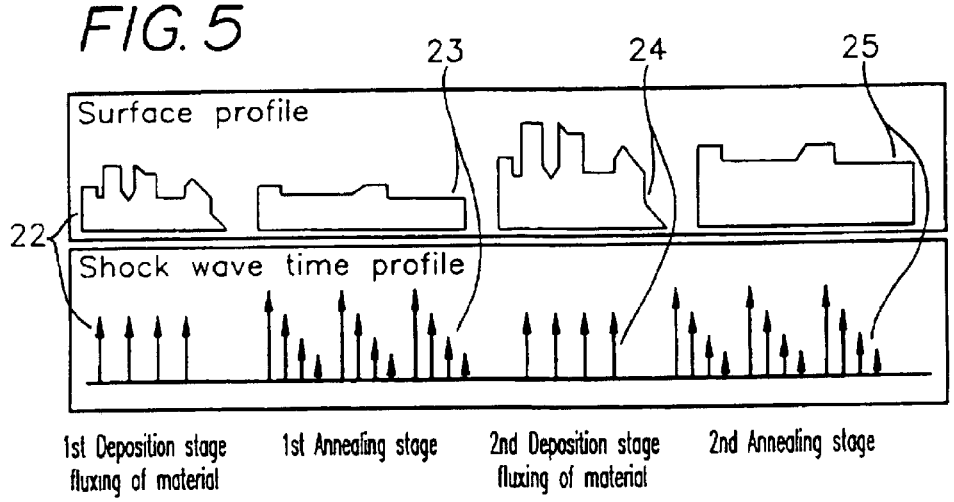
FIG. 5 is a schematic view illustrating the application of multiple heat or shock wave impulses for the purpose of facilitate growth of materials according to the principles of the invention.

As illustrated in FIG. 5, variation of the energy pulses, accomplished by varying the voltage applied to electrode tips 1, 11 illustrated in FIGS. 1 and 2, can be used to enhance or regulate growth in different ways, and even to carry out multiple steps in a manufacturing sequence without have to remove the workpiece from the apparatus or move it to a different cell within the apparatus. In step 22 of the example schematically illustrated in FIG. 5, four identical pulses are to facilitate deposition of materials on a surface of the workpiece. In step 23, the pulse frequency is increased and the pulses varied both in strength and duration to anneal the deposited materials, i.e., to redistribute and bond the deposited materials to the workpiece. In step 24, additional material is deposited on the surface of the workpiece with the assistance of four identical pulses corresponding to those applied in step 22, and in step 25, step 23 is repeated to anneal the deposited additional material.

Although Argon is a particularly preferred cryogenic liquid for purposes of the invention, it will be appreciated that other chemically inert media may be substituted for Argon, including elements or compounds that are in a liquid, semi-solid, or even a solid state at room temperature, whether subcritical or supercritical. In addition, it is possible to use non-inert elements or compounds as the growth media so long as the elements or compounds are compatible with the chemical reactions or processes carried out within the medium.

FIG. 6 lists some of the properties of cryogenic liquids that may be used in the apparatus shown in FIGS. 1 and 2. The elements are all noble (closed shell) gases or simple molecules, and most of the elements are in the liquid state at cryogenic temperatures. $Cl_2$ is the liquid with the highest melting temperature or 171.6 K and is one of three elements that are liquid under standard conditions, Br and Hg being the other elements. The physical behavior of all of the listed elements is very similar since all are Van der Walls liquids, the only difference being the atomic mass or the structure. Any of these elements, as well as other elements or compounds, could potentially be used in the apparatuses of FIGS. 1 and 2:

FIG. 7 shows an embodiment of the invention that has been specifically designed to utilize a cryogenic liquid such as Argon as the growth medium. The apparatus of this embodiment utilizes a single cell divided into multiple subcells or sub-areas for performing multiple processing steps related to manufacture of thin film structures, including growth and cleaning or etching steps. In addition, the apparatus shown in FIG. 7 includes, as will be described in more detail below, at least some of the following mechanisms and features:

- a mechanism for introducing growth material into the growth chamber;
- a mechanism for cleaning the cryogenic liquid to remove growth material and contaminants from respective cells;
- individual control of a discharge from a single tip or array of tips in each of the multiple cells;
- temperature regulation and high pressure operation;
- a mechanism for circulating cryogenic liquid through the growth chamber;
- provision of chemically inert working cell surfaces with very low physisorbtion energies.

In particular, as illustrated in FIG. 7, the multiple cell apparatus of the preferred embodiment includes three cells 30,31,32 arranged in a common growth chamber (not shown) through which a liquid cryogenic material such as Argon is circulated by a router/pump arrangement 33. Each cell includes a workpiece 34,35,36 undergoing various processes. Cell 30 is the deposition cell and includes a platform or mechanism (not shown) for moving the workpiece in the direction of arrows x, y, and z representing Cartesian coordinate axes, and an electrode tip array 37 connected in the manner schematic illustrated in FIG. 2, to facilitate sequential deposition of materials A and B. Cells 31 and 32 are cleaning/etching cells and also include electrode tip arrays 38,39 connected in the manner illustrated in FIG. 2. It will be appreciated that the connections illustrated in FIG. 1 could also be used in one or more of the cells 30,31,32.

The mechanism for creation and introduction of growth species into the growth area of the apparatus illustrated in FIG. 7, and the method for cleaning the cryogenic material, are basically the same. Using as an example element A, the growth species is actually in the form of molecules $M_{xy}$ consisting of the desired element A to be deposited and an etchant element X, which may by way of example include hydrogen ($X_1$), fluorine ($X_2$), or chlorine ($X_3$), chosen so that the molecules $M_{xy}$ are able to physisorb and diffuse around easily on the surface of the substrate.

In the growth process illustrated in greater detail in FIGS. 8A and 8B, the adhered molecule M consisting of the desired growth element A and the etchant X is initially adhered, as illustrated in FIG. 9A, to the surface of the workpiece. Then, as illustrated in FIG. 1B, a low intensity micro discharge from electrode array 37 is used to disassociate the etchant from molecules M and adhere the desired element M onto the growing surface. Afterwards, the reactive X etchant element combines with another X molecule and form unreactive molecules $X_2$, $X_3$, $X_4$ which disperse in the liquid or on the growing surface.

The growth species is created in cell 31, which may be referred to as a "reverse growth cell," by etching the material M with a higher concentration of the etchant molecule X and more powerful discharges from the electrode tip array 38. Initially, as illustrated in FIG. 9A, the etchant molecules are physisorbed onto the surface to be etched, after which as illustrated in FIG. 9B a low intensity nanodischarge is applied to the surface in order to induce chemisorption of the etchant molecules in preparation of electron induced chemical etching, illustrated in FIG. 9C in response to application of high intensity nanodischarge. After etching, as illustrated in FIG. 9D, the etchant molecules are again physisorbed and the liquid in cell 31 must be cleaned of unreacted $MX_y$ molecules, the unreacted molecules being recycled by re-depositing the molecules in the cell 30 where the element was initially etched. The third cell, cell 32, is utilized in a similar manner for etching and cleaning with respect to element B. As those skilled in the art will appreciate, a similar procedure may also be used to free the liquid of initial contaminants such as $H_2$, $O_2$, $N_2$, and $H_2O$.

A particular advantage of the apparatus functionally illustrated in FIG. 7 is that it recycles deposited material, eliminating the drawback of all conventional methods that the material not landing on the top surface of the workpiece in the growth cell is lost from the process forever. The micro discharges from the tip array also provide the opportunity to control the position of the growth/etch process and entirely side step costly lithograph/etch processes. This growth method can achieve everything that the various conventional growth methods can accomplish, in a much more efficient manner.

FIG. 10 shows the energy potentials and barriers associated with the process of etching, the subsequent transport of etched atoms in the cryogenic liquid, and finally growth again on the substrate in the cryogenic growth instrument illustrated in FIG. 7. The energy plot shows how the energy levels of adsorption potentials and etch barriers affect the operation of the growth cell, and determine the relative high amount of energy that needs to be applied by the electrode arrays 35 and 36 in comparison with the amount of energy needed to be applied by electrode array 34 for the purpose of overcoming the reaction barrier to deposition of material in cell 30. The etch energy barriers affect the etch rate of the source material in cells 31 and/or 32 while the low adsorption potential of walls and tips hinders sticking of etched atoms.

In order to apply the energy plot shown in FIG. 10, it is necessary to determine the amount of energy that actually reaches the workpiece in comparison with the amount of energy deposited in the cryogenic growth medium, which depends on the collision cross-section for the electrons hitting the atoms and electrons of the liquid, and is limited by the breakdown strength of the cryogenic liquid. If 90% of the energy is deposited in the liquid and the remainder in the anode (which is a reasonable assumption since the means free path for electrons in solids is on the order of 100Å when the electron energy is a few eV), then a 100V pulse of 500 $\mu$A and duration of 1 nsec will deposit an energy of 4.5× $10^{-12}$ J or approximately $5\times10^7$ eV. The electric field strength at the tip distance of 1 $\mu$m would be $10^8$ V/m, which in the case of Argon is the maximum field strength that can be delivered without breakdown of the cryogenic liquid. Since the volume of the deposited energy is roughly 1.0 $\mu m \times \pi \times 1$ $nm^2 = 1\times10^{-24} m^3$ or $1\times10^{-18}$ $cm^3$ or $\approx 10^4$ atoms for this field strength, the average deposited energy of each atom in the volume is 5000 eV in the 1 nsec time interval, assuming no energy is lost from the region during the heating pulse. This is a very high energy density and in a matter of nanoseconds the deposited energy will travel in the form of a shock wave through the liquid at the speed of $10^3$ to $10^4$ m/sec or 1 to 10 $\mu$m/nsec.

Depending on the duration of the pulse and the pressure in the liquid, a gas bubble may be formed in the liquid. The energy of the unfocused shock/heat wave will decrease to a first approximation as $r^{-2}$ where r is the distance from the core discharge. After one micrometer of expansion, the energy density of the shock/heat wave will be much lower, or a few eV, which is the typical value of controlled energy enhanced growth. Since average energy of 1 eV corresponds to a temperature of close to 1200° C., there is ample opportunity to lower the pulse energy and obtain thermal impulse with lower equivalent growth temperatures.

In addition, since modern diamond coated silicon electrode tips of 1 μm diameter size are able to withstand stable emission currents of 300 to 500 μA in continuous operation, it is possible in pulsed operation to stretch the current rating much higher, and therefore to modify the growth process by increasing the energy of the electrons in the liquid present in the gap between the tip and anode to as high as 10 eV, in which case the cross-section for ionization starts to increase to the point where a considerable concentration of ionized cryogenic atoms is produced in the wake of the electron pulse. Depending on the pulse duration length, the electrons so produced will be swept towards the anode, leaving behind more massive and slower ions. The more massive and slower ions form a space charge which will eventually quench the micro/nano discharge. After the discharge, the ions diffusing around the liquid will have an effect on the growth process.

In the apparatus of FIG. 7, each cell must be temperature regulated within a particular range of temperatures and to withstand particular pressures. By way of example but not limitation, the cell may be regulated to a temperature range of 80 to 170° K and should be able to withstand pressures of 50–100 bar. During growth, the discharges from the electrode tip array constantly heat the liquid, and thus adequate circulation and a heat sink need to be provided. If one micro discharge dissipates energy of $10^{11}$ J as described above, and the number of discharges per second is $10^5$, then for a tip array consisting of $10^6$ tips and a total area of 1 cm$^2$, an energy of 1 J/sec or 1 Watt will be deposited into the cryogenic liquid, and which must be removed as quickly as possible.

Among the applications of the invention described above are applications involving growth of fine nanoscale structures. In that case, temperature and pressure requirements and the role of the cryogenic liquid in general may be different than those described above. In such applications, consideration must be given to the likelihood that the energy deposited in the liquid is relatively small compared to the energy deposited in the workpiece. In particular, when the distance between the tip and workpiece is smaller than 10 nm, the mean free path of the electrons in the growth medium, the main role of the growth medium is to serve as a carrier of depositing material and to keep the growth species in place when the energy is applied in the form of high energy electrons emitted from the electrode tip. As a result, the greater part of the heat will be generated in the workpiece itself, and appropriate modifications to the apparatus will need to be made. In general, it will be appreciated that in all applications of the invention, the role of the growth medium will generally vary depending on the tip distance and the density and pressure of the growth medium.

Taking into account differences in the role of the growth medium when used in the growth of fine nanoscale structures or "nanostructures," it is anticipated that those skilled in the art will be capable of modifying the instrument shown in FIG. 7 to accommodate growth of various nanostructures such as nanotubes, nanodiamonds, and insulating materials (in a mixture of liquid argon and oxygen), as well as other nanodevices, including materials selected from groups IIB to VIIB of the periodic system as well as hydrogen.

Figure 11:
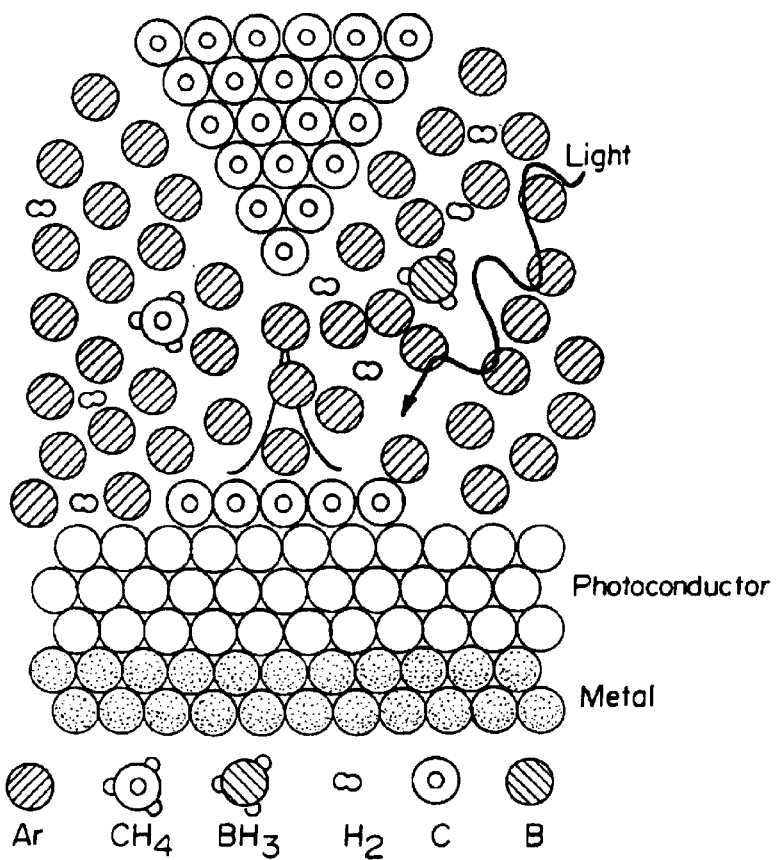
FIG. 11 is a schematic view illustrating the use of a scanning tunneling electron microscope tip to grow and monitor nanostructures according to a third preferred embodiment of the invention.
Figure 12:
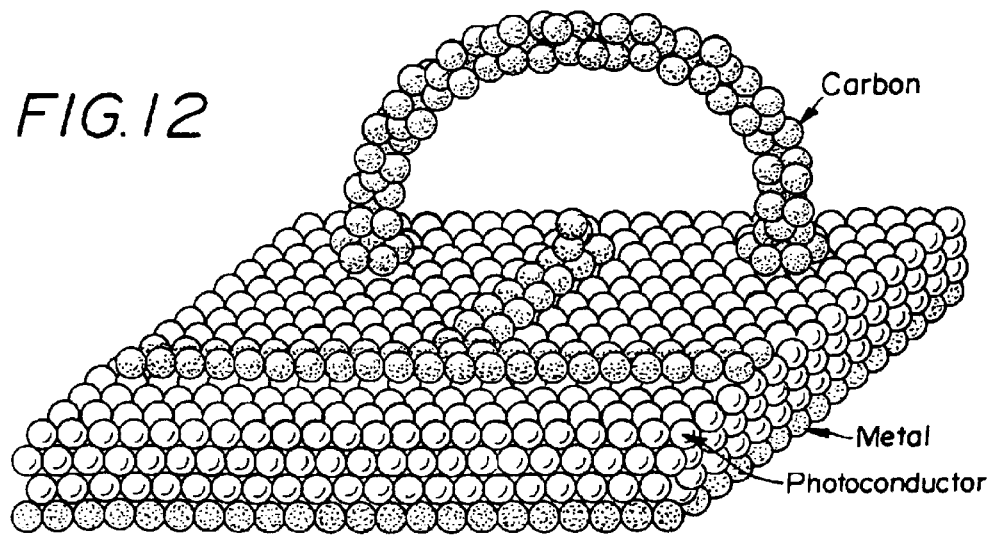

By way of example, as illustrated in FIG. 11, a mixture consisting of (i) a liquid, critical state element, or gas such as argon, (ii) methane or another carbon-containing molecule, and (iii) boronhydride or another boron containing molecule, may be used to grow nanostructures made of elements carbon (C) and boron (B) on a photoconducting material which is conductive when illuminated with light. This enables use of a scanning tunneling microscope tip to grow and monitor the intended carbon-boron nanostructures. If light is absent during the growth process, the photoconductor layer will function as an insulator layer and the grown nanostructure will function as a nanoelectrical device. Such a nanostructure may, as illustrated in FIG. 12, be constructed as a DNA probe device using routing of charged molecules in the growth medium and electrode guiding. Alternatively, as illustrated in FIG. 13, the structure may be formed as a used for Nottingham cooling by emission of electrons from the tips, and as illustrated in FIG. 14, for the purpose of constructing CMOS like nanodevices including nanowires with a small "oxide" like structure made of boron and carbon fixed thereto, with a gate structure connected to the boron-carbon structure.

Having thus described a preferred embodiment of the invention in sufficient detail to enable those skilled in the art to make and use the invention, it will nevertheless be appreciated that numerous variations and modifications of the illustrated embodiments may be made without departing from the spirit of the invention, including variations in the processes and material to which the invention is applied (such as by substituting etching for growth), as well as the specific manner in which the thermal spikes or shockwaves are generated and transmitted through the growth medium (for example by reversing the electric polarity of the illustrated electron emitter tip to form an anode rather than a cathode), and therefore it is intended that the invention not be limited by the above description or accompanying drawings, but that it be defined solely in accordance with the appended claims.

I claim:

1. A method for processing a material by locally raising a temperature of the material by transferring energy to the material in order to facilitate chemical reactions or processes related to processing of the material, comprising the steps of:

providing a cryogenic medium that has been cooled to a cyogenic temperature, said cryogenic medium at least extending between an electrode and the material;

causing the electrode to emit or attract electrons by applying voltage pulses to the electrode to cause propagation of a succession of thermal spikes or shockwaves in the cryogenic medium, said thermal spikes or shockwaves transferring energy from the electrons through the cryogenic medium in order to affect an area of the material; and varying an energy of the thermal spikes or shockwaves by varying the energy of said electrons emitted by or attracted to the electrode, wherein a dimension of said thermal spikes or shockwave is on the order of less than one manometer to several tens of micrometers, and a total linear dimension of the material affected by energy carried by the thermal spikes or shockwaves, is on the order of less than one nanometer to several tens of micrometers.

2. A method as claimed in claim 1, wherein said electrode is an electron emitter tip.

3. A method as claimed in claim 2, wherein said thermal spikes or shockwaves are generated by transmitting electrons from said electron emitter tip towards the material.

4. A method as claimed in claim 2, wherein said thermal spikes or shockwaves are generated by transmitting electrons in a direction generally parallel to a surface of the material, said electrons being transmitted in said generally parallel direction from said electron emitter tip towards an anode.

5. A method as claimed in claim 1, wherein a duration of the thermal spikes or shockwaves ranges from a few picoseconds to several hundred nanoseconds.

6. A method as claimed in claim 1, wherein the medium is in a gas, liquid, or supercritical state.

7. A method as claimed in claim 6, wherein the cryogenic material is a cryogenic liquid.

8. A method as claimed in claim 1, wherein said voltage pulses are variable voltage pulses of on the order of a few picoseconds to hundreds of nanoseconds.

9. A method as claimed in claim 1, wherein said processing includes deposition of materials.

10. A method as claimed in claim 9, wherein said processing includes deposition of materials, followed by cleaning of a resulting product.

11. A method as claimed in claim 10, where said processing includes deposition of materials, followed by etching and cleaning of the resulting product.

12. A method as claimed in claim 1, wherein said processing includes etching.

13. A method as claimed in claim 12, wherein gases used in said etching are selected from the group consisting of hydrogen, chlorine, and fluorine.

14. A method as claimed in claim 1, wherein said processing includes growth of said material in a growth subcell, and etching and cleaning of the material in respective cleaning and etching subcells, said growth, cleaning, and etching subcells all being in communication and situated in a single growth cell.

15. A method as claimed in claim 1, wherein said processing includes growth of said material in a growth sub-area, and etching and cleaning of the material in respective cleaning and etching sub-areas, said growth, cleaning, and etching sub-areas all being in communication and situated in a single growth cell.

16. A method as claimed in claim 1, further comprising the step of assisting said processing by applying photons from a photon source of sufficient energy to lower reaction barriers or to break or weaken chemical bonds.

* * * * *